United States Patent [19]
Rathbun, Jr.

[11] Patent Number: 5,191,824
[45] Date of Patent: Mar. 9, 1993

[54] METHOD AND APPARATUS FOR FORMING A CONTOURED SURFACE

[75] Inventor: Alan E. Rathbun, Jr., Kent, Ohio
[73] Assignee: Luxaire Cushion Co., Newton Falls, Ohio
[21] Appl. No.: 803,344
[22] Filed: Dec. 4, 1991
[51] Int. Cl.$^5$ .............................................. B26F 3/12
[52] U.S. Cl. ........................................ 83/874; 83/16; 83/410; 83/410.7; 83/410.8; 83/171; 83/651.1
[58] Field of Search ...................... 83/16, 56, 410, 439, 83/651.1, 171, 410.7, 410.8, 411.4, 426

[56] References Cited

U.S. PATENT DOCUMENTS

| | | | |
|---|---|---|---|
| 3,685,377 | 8/1972 | Peck et al. | 83/210 |
| 4,606,254 | 8/1986 | Schmalz | 83/874 |
| 4,683,791 | 8/1987 | Demont | 83/874 |
| 4,708,760 | 11/1987 | Mark et al. | 156/251 |
| 4,850,844 | 7/1989 | Hunting | 83/874 |
| 5,005,289 | 4/1991 | Vogele | 83/171 |

*Primary Examiner*—Frank T. Yost
*Assistant Examiner*—Allan M. Schrock
*Attorney, Agent, or Firm*—Renner, Kenner, Greive, Bobak, Taylor & Weber

[57] ABSTRACT

Forming apparatus (10) embodying the concepts of the present invention has a base (12). A carriage (14) is supported on the base (12) so as to be translatable along a translational direction (16). A cradle (46) is mounted on the carriage (14) for rotation about a rotational axis (48). The cradle (46) is adapted to support a block (B) of material. A cutting member (92) is adapted to engage the block (B) of material upon translation of the carriage (14) along the translational direction (16). A rotational rate selector (70) selectively controls the range through which the cradle (46) rotates in response to translation of the carriage (14). The method embodying the present invention thus utilizes the following steps. The block (B) to be contoured is mounted on a cradle (46) having a translational direction (16) and a rotational axis (48). A linear cutting member (92) is presented substantially perpendicular to the translational direction (16), and the cradle (46) is simultaneously translated and rotated relative to the cutting member (92). The block (B) is severed with the cutting member (92) simultaneously with the relative translation thereof to form contoured surfaces (S) on the opposed separated portions of the block (B).

21 Claims, 7 Drawing Sheets

METHOD AND APPARATUS FOR FORMING A CONTOURED SURFACE

TECHNICAL FIELD

The present invention relates generally to methods and apparatus for forming contoured surfaces. More particularly, the present invention relates to methods and apparatus for forming a contoured surface on a block of material by a linear cutting device. Specifically, the present invention provides for cutting a block of material into two pieces with a linear cutting device in such a way that contoured surfaces—which may be in the configurations of a hyperbolic paraboloid—are simultaneously formed on the opposed parting surfaces formed by the linear cutting device.

BACKGROUND OF THE INVENTION

Although the present invention may have application in forming contoured surfaces on a wide variety of materials, and for widely diverse uses, the concepts of the invention can be clearly understood by an explanation which relates to the usage of the invention to form a backrest cushion for a human. Once the concepts of the invention are understood in their application to the fabrication of backrest cushions, those concepts can be readily adapted to the forming of contoured surfaces on a wide variety of materials for numerous purposes.

Backrests, and particularly those adapted to support the lumbar region as well as the lateral sides of the torso, present a highly complex, contoured surface which curves convexly in a vertical orientation to support the lumbar arch and at the same time curves concavely in a transverse orientation to conform with, and support, the lateral sides of the torso. In mathematical terminology the geometry of the aforesaid backrest surface is a hyperbolic paraboloid. An understanding as to how a linear cutting device can form a hyperbolic paraboloid according to the concepts of the present invention will allow those skilled in the art to adapt the present invention to other purposes.

The typical backrest support cushion is often formed from an expanded cellular foam so that it will be soft and pliable, even though it does have a supporting surface which is convexly curved to conform to the lumbar arch and two wing surfaces adapted to engage the lateral sides of the torso.

Backrest cushions have historically been formed by molding or by a combined deformation and cutting process. In the molding process a separate and distinct mold is required for each size cushion as well as for cushions of the same size having variations in the curvature, or other dimensions, of the lumbar supporting region and/or variations in the curvature, or other dimensions, of the laterally spaced wing portions adapted to engage the sides of the torso. For example, it may be desirable to provide a more or less pronounced curve for supporting the lumbar arch or to provide the cushion with a lumbar supporting region that is not sagittally oriented—i.e., a lumbar supporting region that is tilted in one direction or another from the central, sagittal plane. Each such variation requires a separate and distinct mold. Thus, a large inventory of expensive molds must be maintained to provide even the most routine variations, and, because of normal wear and tear, it is necessary to replace the molds for the more popular cushions from time to time thereby further adding to the expense of the molding process.

In addition to the molds themselves, the machines by which the molds are operated are themselves intricate devices which are not only expensive to manufacture but also to maintain, adding still further to the expense of the molding process. Another drawback of the molding process is that only one cushion can be produced per mold cavity during the time cycle of the molding process.

The deformation and cutting process involves the use of complicated, preformed, and opposed, dies to compress a block of resilient material to varying degrees according to a predetermined complex pattern so that when the block is compressed and then cut transversely between the dies, the material will expand to the desired shape across the full face of each parting surface after the pressure of the dies has been released. As should be apparent, it is an extremely complicated process even to design the pattern of the compressing surfaces on the dies so that the required selective compression of the block will be accomplished. Moreover, accuracy will depend upon the consistency of the material from which the block is made, and any block-to-block variation in the resilience of the material, or even spot-to-spot variations within a block, will result in inaccurately contoured surfaces. As such, it is quite difficult to replicate a particular shape from run to run with different lots, or stocks, of resilient material, and impossible to use the compression and cutting process on a non-resilient material. Obviously, therefore, the deformation and cutting process also requires a distinct pair of opposed dies for each size and each shape of backrest cushion. Thus, the die inventory cost disadvantage for the compression and cutting process is comparable to the mold inventory cost disadvantage of the molding process. Here, too, a machine is required to compress a block of material positioned between the opposed dies. As with the molding process, the initial investment and upkeep of the machines and dies for the compression and cutting process is significant and results in increased cost for a cushion made by that process.

SUMMARY OF THE INVENTION

It is, therefore, a primary object of the present invention to provide an improved method and apparatus for forming a contoured surface.

It is another object of the present invention to provide an improved method and apparatus, as above, for simultaneously forming a pair of articles having mirror image, contoured surfaces from a single block of material, which surfaces can be readily replicated without regard to the resilience of the material being formed.

It is a further object of the present invention to provide an improved method and apparatus, as above, without the need to employ either molds or dies and thus without the need to acquire and maintain an expensive inventory thereof.

It is yet another object of the present invention to provide an improved method and apparatus, as above, wherein a plurality of sizes, and contours, can be made by effecting relatively simple adjustments to the apparatus.

It is a still further object of the present invention to provide an improved method and apparatus, as above, for forming a contoured surface on a block of material by mounting the block on a cradle which is simultaneously rotated and translated relative to a substantially linear cutting member.

It is an even further object of the present invention to provide an improved method and apparatus, as above, for providing predetermined, complimentarily opposed, contoured surfaces on a pair of articles cut from a single block of material wherein the block is placed in a cradle that is mounted for rotation on a translatable carriage with one diagonal axis of the block being disposed substantially parallel to the direction of translation and further wherein the block is simultaneously translated, by movement of the carriage, and rotated, by movement of the cradle, while a linear cutting member acts in a plane substantially perpendicular to the direction of translation to sever the block along opposed parting faces and thereby form the desired contour—which may be a hyperbolic paraboloid.

These and other objects of the invention, as well as the advantages thereof over existing and prior art forms, which will be apparent in view of the following detailed specification, are accomplished by means hereinafter described and claimed.

Broadly, an apparatus intended to perform the present invention has a cradle means for supporting a block of material on which the contoured surface is to be formed. Means are provided to rotate the cradle means about a rotational axis, and means are also provided to translate the cradle along a direction of translation. In addition, means must be provided to assure that rotation of the cradle occurs only in response to translation thereof. A linear cutting member intersects the rotational axis to engage the block as it is simultaneously rotated and translated, The exemplary apparatus depicted has a base. A carriage is supported on the base so as to be movable by linear displacement—i.e.: in a translational direction. A cradle is mounted on the carriage for movement about a rotational axis, and the cradle is adapted to support a block of material. A cutting member is adapted to engage the block of material upon translation of the carriage, and a rotational rate selector selectively controls the range through which the cradle rotates in response to translation of the carriage.

Finally, it should be appreciated that whereas the description will hereinafter continue to describe rotation and translation of the cradle with respect to the cutting member, it is the relative motion between those two components that is important. As such, one could, if desired, rotate and translate the cutting member relative to the cradle.

As such, a method embodying the present invention utilizes the following steps. The block to be contoured is mounted on a cradle having a rotational axis and being translatable. A linear cutting member is presented substantially perpendicular to the translational direction, and the cradle is simultaneously translated and rotated relative to the cutting member on the respective axes. The block is severed by the cutting member according to the pattern defined by the simultaneous, and relative, translation and rotation of the block to form a contoured surface on the opposed parting faces of the block. The relative translation and rotation is a linear function that can be mathematically stated as a trigonometric function.

The method and apparatus which embody the concepts of the present invention are described in conjunction with one exemplary embodiment of an apparatus which is deemed sufficient to effect a full disclosure of the subject invention. That exemplary apparatus is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
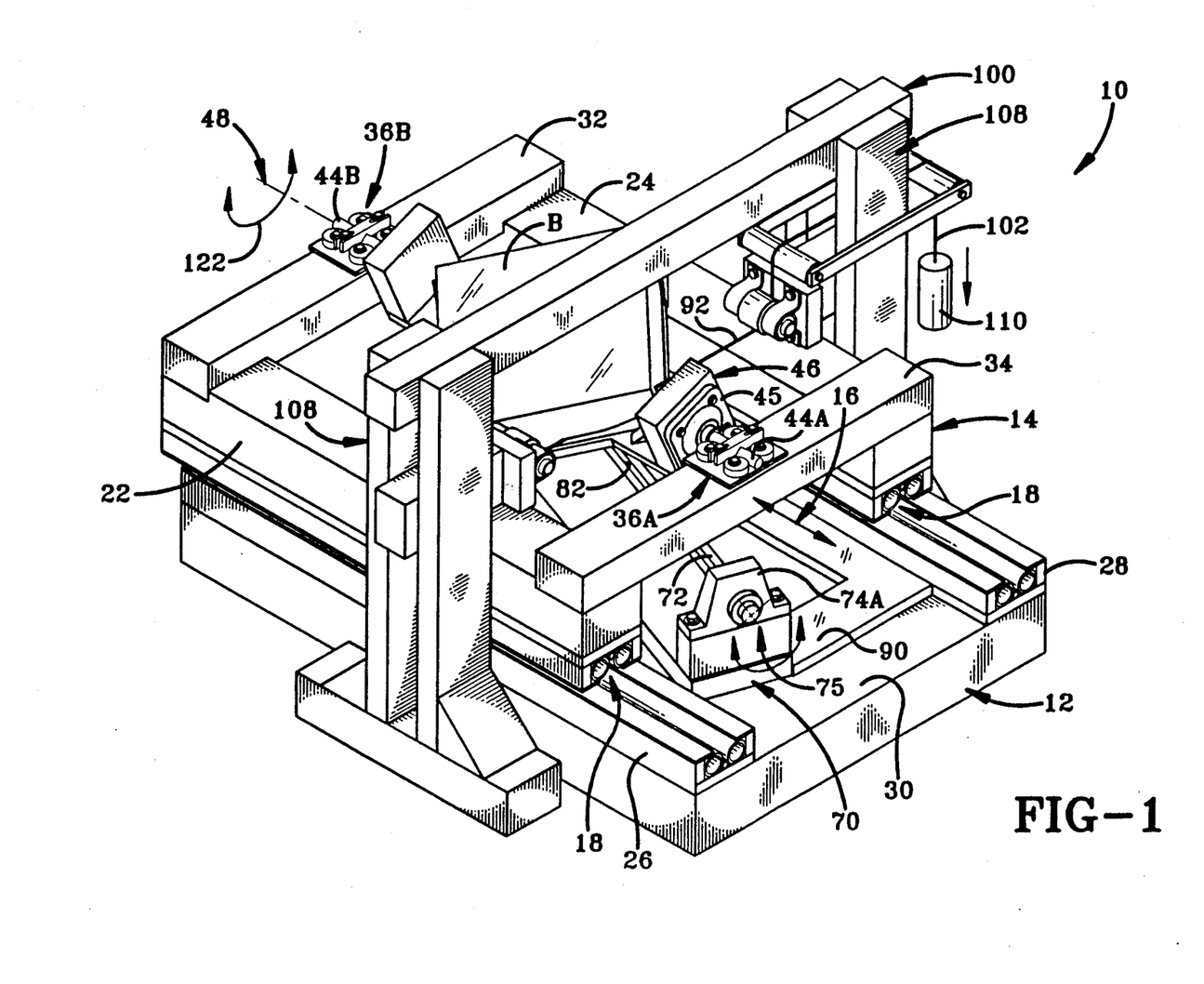
FIG. 1 is a perspective view of an assembled forming apparatus embodying the concepts of the present invention.
Figure 2:
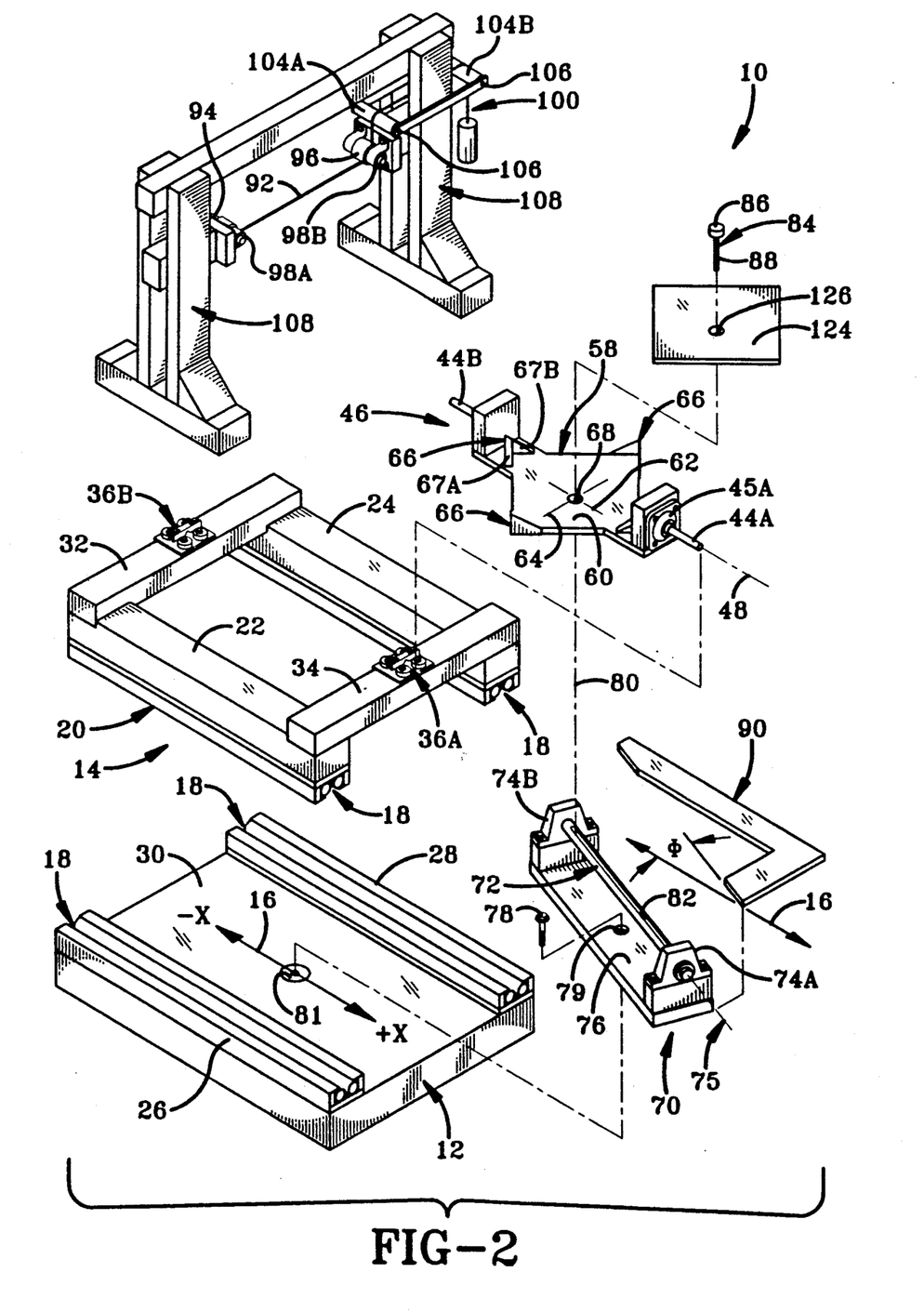
FIG. 2 is an exploded perspective of the forming apparatus depicted in FIG. 1.

One representative forming apparatus embodying the concepts of the present invention is designated generally by the numeral 10 on the accompanying drawings. With particular reference to FIGS. 1 and 2, the forming apparatus 10 has a base 12 on which a carriage 14 is supported for linearly reciprocal movement along a translational direction defined by the double headed arrow 16 in FIG. 1. To facilitate the translational movement, a low friction, linear, ball bearing assembly 18 is interposed between the carriage 14 and the base 12.

The carriage 14 has a rectangular frame portion 20, and the bearing assembly 18 may be interposed between the laterally spaced side members 22 and 24 of the frame portion 20 and a pair of laterally spaced rails 26 and 28 which may project above the upwardly directed face 30 of the base 12. The frame portion 20 has a pair of transversely extending, cross members 32 and 34 which join the longitudinally opposite ends of the side members 22 and 24. A pair of longitudinally aligned, adjustable axle support assemblies 36 are supported from the medial portion of each cross member 32 and 34.

In the convention just introduced, and in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation employed for general identification of that structural member, component or arrangement. Thus, there are at least two axle support assemblies which are generally identified by the numeral 36, but the specific, individual axle support assemblies are, therefore, identified as 36A and 36B in the specification and on the drawings. This same suffix convention shall be employed throughout the specification.

Figure 4:
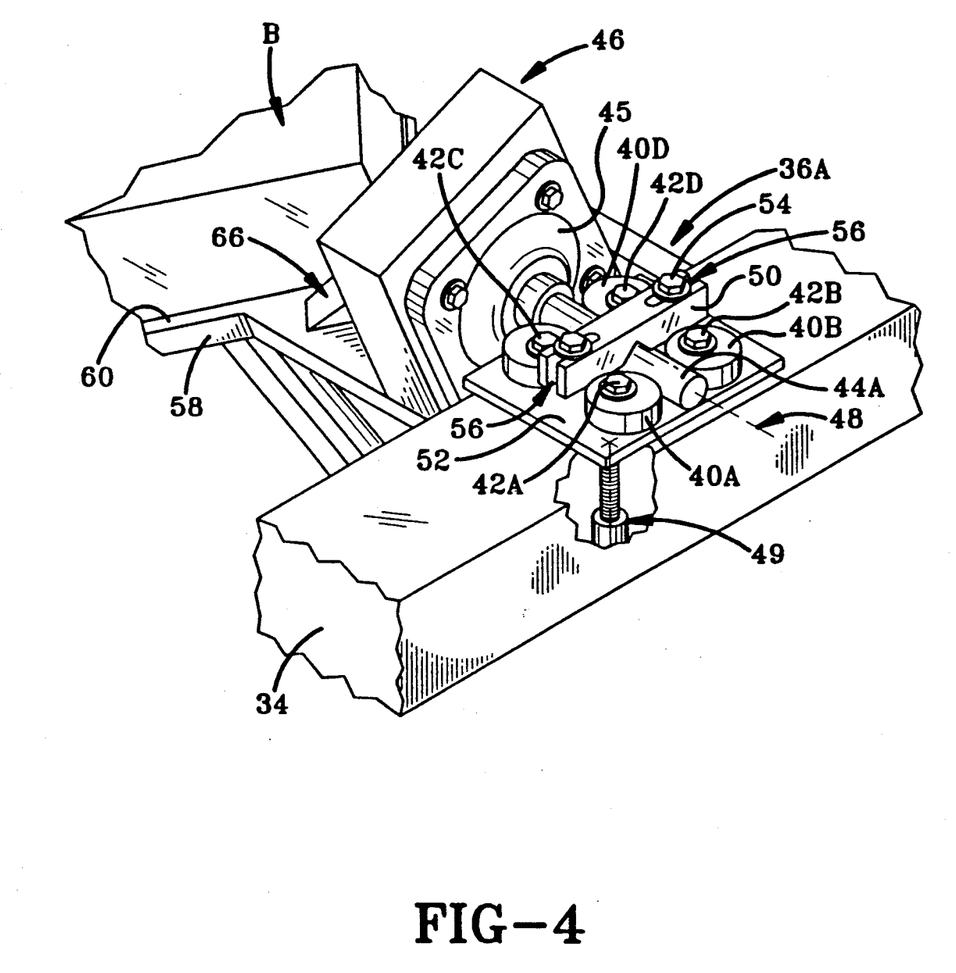
FIG. 4 is an enlarged area of FIG. 1 to depict the adjustable axle supporting assembly in greater detail.

As best seen from FIG. 4, each axle support assembly 36 has four eccentric bushing members 40 which are mounted on hub fasteners in the nature of cap screws 42. The bushing members 40 cooperate in pairs rotatably to support and transversely to position axle stubs 44 which extend outwardly from bearing blocks 45 mounted on each end of the cradle 46. As such, the axle stubs 44 define the rotational axis 48 (FIG. 1) of the cradle 46. Because of their eccentricity, the bushing members 40 can be selectively rotated on their hub fasteners 42 to select the disposition, or angularity, of the rotational axis 48 relative to the translational direction 16. Each axle stub 44 is restrained in the vertical direction by a clamping bar 50 which is disposed transversely between pairs of the bushings 40 and is secured to the cross members 32 and 34, or plates 52 disposed thereon, by fastening members in the nature of bolts 54 received through clevis slots 56. Specifically, a pair of the bushing members 40A and 40B are located outboard of the pair of bushing members 40C and 40D, and the clamping bar 50 is disposed between those pairs.

To adjust the orientation of the rotational axis 48, all the hub fasteners 42 are loosened and the eccentric bushing members 40 are rotated about their respective hub fasteners 42 to shift the shaft stubs 44, as desired. Because of the eccentricity of the bushing members 40, their coordinated rotation effects precise orientation of the rotational axis 48. In some situations it may, for example, be necessary, or be desired, to skew the rotational axis 48 with respect to the translational direction 16. The axle support assemblies 36 permit the desired angularity to be precisely adjusted.

It may also be desirable to permit vertical adjustment of the axle support assemblies 36, and such an objective may be accomplished by the use of a plurality of jack screws 49 which are operatively connected to, and extend upwardly through, the cross members 34 to engage the undersurface of each plate 52. The jack screws 49 may therefore be used to adjust the vertical position of the individual axle support assemblies 36, and it should also be appreciated that selective operation of the jack screws 49 will permit one to tilt each plate 52, and thus each support assembly 36, as desired.

The cradle 46, as is also best seen in FIG. 2, is depicted as having a quadrilateral pan 58 with a flat supporting surface 60. The supporting surface 60 has diagonals 62 and 64, with the diagonal 62 being parallel with the rotational axis 48. Each corner of the pan 58 is provided with retainers 66 which may be comprised of generally triangular tabs 67A and 67B which intersect at each corner of the pan 58 and which are perpendicularly disposed with respect to each other. A block "B" may be positioned on the supporting surface 60 of the pan 58 and secured by frictional engagement of the corners on each block "B" with the retainers 66. The typical block "B" may comprise a parallelepiped having rectangular faces—i.e.: a right parallelepiped, the faces of which may well be either square, as shown, or rectangular.

The cradle 46 has a central aperture 68 which opens vertically through the supporting surface 60 of the pan 58 at the intersection of the diagonals 62 and 64. The purpose of the central aperture 68 will be hereinafter more fully explained.

Figure 5A:
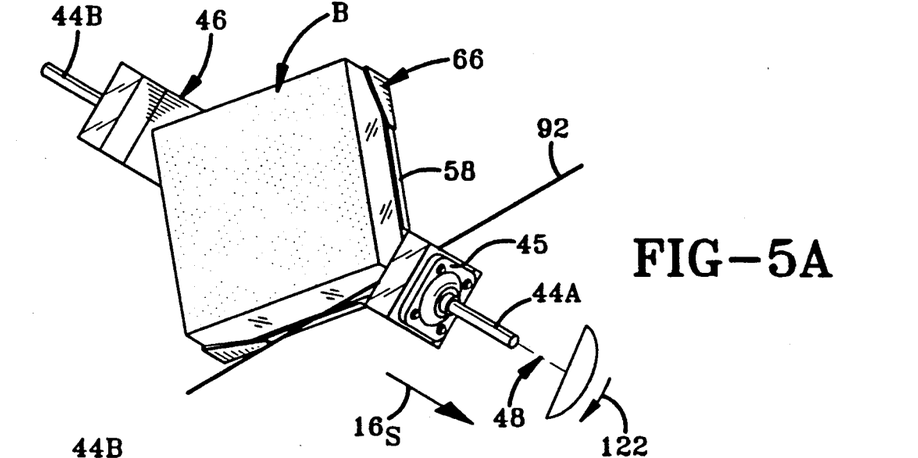
FIGS. 5A through 5E are schematic representations of a cradle employed in the forming apparatus, with a block of material being supported on the cradle, the series of views depicting the cradle as being sequentially rotated and translated with respect to a cutting member progressively to form the opposed and contoured surfaces upon the parting faces of the cushions cut from the original block.
Figure 5B:
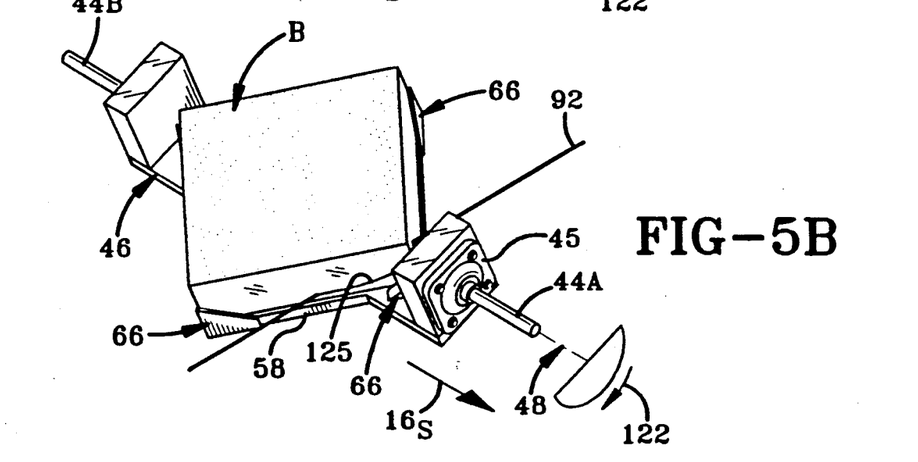
Figure 5C:
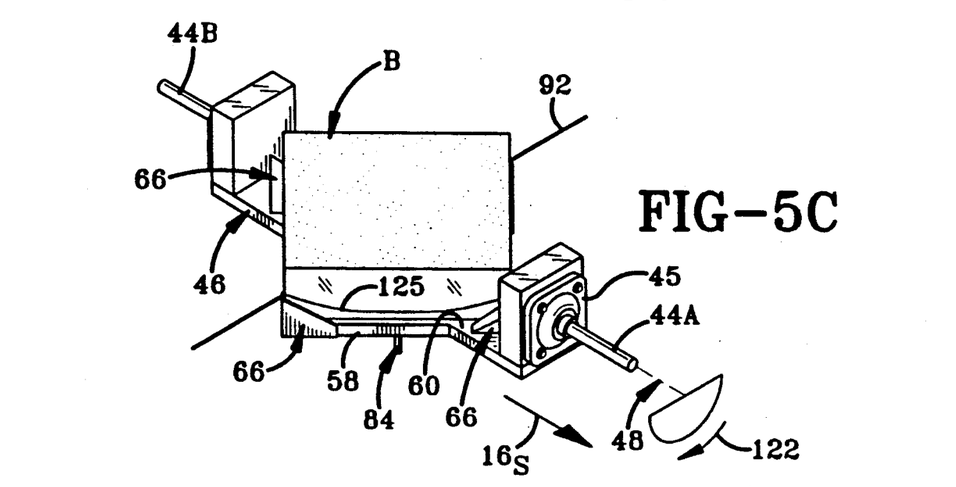

A rotational rate selector 70 has a guide member 72 which is rotatably supported in a pair of spaced, pillow block bearings 74 that are mounted on opposite ends of a base support bracket 76 to permit rotation of the guide member 72 about a second rotational axis 75. The base support bracket 76 is rotatably positioned on the upwardly directed face 30 of the base 12 by a pivot pin, or post, 78 which is received in a bore 79 that penetrates the base support member 76. The post 78 may be centered in the face 30 of the base 12, and as such is aligned with a vertical, rate selecting axis 80 passing through the intersection of the diagonals 62 and 64 when the cradle 14 is centered in its rotational movement about the rotational axis 48—i.e.: with the support surface 60 on pan 58 parallel to the face 30, as represented in FIG. 5C. As such, the post 78 is received within a central aperture 81 that penetrates the upwardly directed surface 30 of the base 12. The guide member 72, which may, as shown, be in the configurations of a cylindrical rod, has a slot 82 which extends longitudinally between the bearings 74A and 74B.

An interfacing connector 84 which may be in the nature of a pin, passes through the central aperture 68 to be received within the slot 82. Retention of the interfacing connector 84 in the central aperture 68 can be accomplished in any well known manner such as by having a head portion 86 formed at one end of the shaft portion 88 which forms the interfacing connector 84 or by having a retaining ring (not shown) secured thereto. There are many well known structural arrangements which will perform the desired function of retaining the interfacing connector 84 in situ. Irrespective of how the interfacing connector 84 is retained, the shaft portion 88 must be free to reciprocate along the slot 82. As will become hereinafter more apparent, the interfacing connector 84 provides a critical link between the guide member 72 in the rotational rate selector 70 and the cradle 46.

It is also quite important that the base bracket 76 be rotatable with respect to the face 30 so that the rotational axis 75 of the guide member 72 may be selectively disposed in angular relation to the translational axis 16. When the axis 75 of the guide member 72 is oriented parallel to both the rotational axis 48 of the cradle 46 and the translational axis 16 of the carriage 14, the cradle 46 will not rotate in response to translation of the carriage 14. However, when the axis 75 of the guide member 72 is disposed at some angle with respect to the translational direction 16 along which the carriage 14 moves, and the carriage 14 is moved along its translational direction 16, the interaction between the interfacing connector 84 and the slot 82 in the guide member 72 will cause the cradle 46 to rotate in response to translation of the carriage 14, and the degree to which the rotational axis 75 of the guide member 72 is angularly disposed with respect to the translational direction 16 of the carriage 14 will determine the rate, and thereby the range, through which the cradle 46 will rotate in response to a given translation of the carriage 14.

The angular position of the rotational rate selector 70, as determined by the disposition of the base support bracket 76, and therefore the rotational axis 75 of the guide member 72, can be established and maintained by inserting a locking wedge 90 between the base support bracket 76 and one of the lateral rails 26 or 28 on the base 12, as seen in FIG. 1. One may, of course, have a plurality of locking wedges 90 appropriately marked so that one may simply select that wedge 90 which secures the rotational axis 75 of the guide member 72 on the rotational rate selector 70 at the desired angularity with respect to the translational direction 16.

There are, of course, many alternative methods and structures for establishing the angular disposition of the rotational rate selector 70. For example, the upwardly directed face 30 of the base 12 can be provided with a plurality of angularly spaced holes (not shown), and one or more holes (also not shown) can be formed in the base support bracket 76. By aligning a hole in the base support bracket 76 with one of the spaced holes in the face 30 and inserting a pin in the aligned holes, the angular disposition of the rotational rate selector 70 may be established and maintained. Irrespective of how it may be accomplished, it is desirable that some arrangement be adopted so that the angular disposition of the rotational rate selector 70 can be readily selected, and maintained, as desired.

Figure 3:
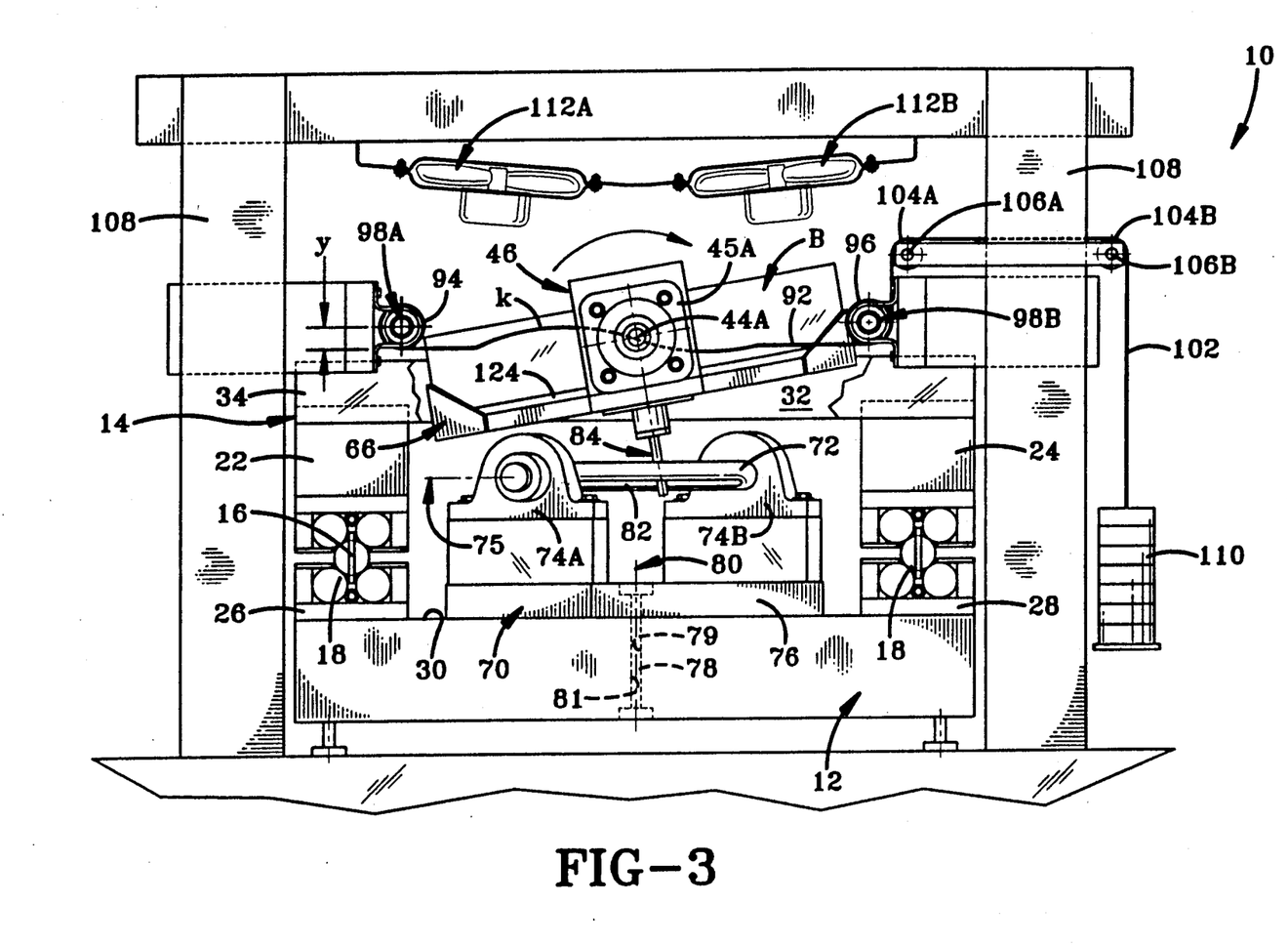
FIG. 3 is an enlarged frontal elevation of the forming apparatus depicted in FIGS. 1 and 2.

An exemplary cutting means includes a cutting member 92 in the nature of a strip of electrical resistance wire which, as seen in FIG. 3, may be wound on spaced bus bars 94 and 96 which are secured in respective block bearings 98A and 98B, respectively, which are secured to a cutting tower 100 at a predetermined distance "y" above the rotational axis 48. In the arrangement depicted, locating the bearings 98 at a distance "y" above the rotational axis 48 disposes the cutting member 92 such that it intersects the rotational axis 48. The bus bar 96 has a force transfer cable 102 wound thereon at a non-conductive location. The cable 102 passes over a pair of rollers 104 which are rotatably mounted on respective shafts 106 which, in turn, are mounted on vertical posts 108 that form the side members of the cutting tower 100. The cable 102 may be secured to a weight 110, or other tension means.

A voltage differential generated by any conventional source, not shown, is applied across the bus bars 94 and 96, thereby causing the cutting member 92 to be heated. In the heated condition the cutting member 92 will be effective to cut a block "B" of cellular foam. However, the cutting member 92 will expand and contract as the voltage is applied and released. To accommodate thermal expansion and contraction, the bus bar 96 is free to rotate, and the weight 110 on cable 102 is effective to maintain a constant tension on the cutting member 92 and prevent sagging between the bus bars 94 and 96 when a voltage is applied to heat the cutting member 92, and it thermally expands. If desired, fans 112A and 112B can be strategically located to direct a flow of cooling air over the cutting member 92 in order to prevent the cutting member 92 from overheating, as might occur when the cutting member 92 is not in the process of cutting.

Operation

In general, a forming apparatus 10 embodying the concepts of the present invention will produce a variety of cushions, such as the backrests "C," of different sizes and shapes. The present invention utilizes a cradle 46 that is rotatably supported on a carriage 14. The carriage 14 is supported on a base 12 such that the carriage 14 is movable along a translational direction 16. The rotational axis 48 of the cradle 46 is preferably adjustable, but for a typical cushion "C" the rotational axis 48 is parallel with the translational direction 16. For the typical cushion "C", the block "B" is preferably disposed so that the diagonal thereof is parallel with the diagonal 62 of the pan 58 and is, therefore, also parallel to the translational direction 16 along which the cradle 46 is movable. A mechanism for controlling rotation of the cradle 46 includes a rotatable guide member 72 provided with a longitudinal slot 82, and the interfacing connector 84, which is secured to the cradle 46, is operatively slidable within the slot 82. The rotational axis 75 of the guide member 72 is selectively angled relative to the orientation of the translational direction 16. The kinematic of the interconnection between the cradle 46 and the rotational rate selector 70 by the interfacing connector 84 will cause the cradle 46 to rotate about its axis 48 in coordination with translatory motion of the cradle 46 on the carriage 14.

A cutting member 92 intersects, and is coplanar with, the rotational axis 48 of the cradle 46. The cutting member 92 will sever the block as the block is translated and rotated relative thereto. When cutting a block "B" of cellular foam, the cutting member 92 may be an electrical resistance wire which has a voltage differential applied thereto such that the wire becomes sufficiently hot to cut the material. The process is effective to cut a block "B" into two cushions "C" which are mirror images. Thus two cushions $C_1$ and $C_2$ are formed from each block "B" during the process.

The cradle 46 will accept blocks "B" of various thickness, but because the cutting member 92 must intersect the rotational axis 48 to produce mirror image surfaces $S_1$ and $S_2$, in order to vary the thickness of the resulting cushions $C_1$ and $C_2$ an appropriate compensating plate 124 may be interposed between the block "B" and the supporting surface 60 on the pan 58. As shown in FIG. 2, the compensating plate 124 may be provided with a bore 126 through which the interfacing connector 84 can be received. Such an arrangement will ensure that the compensating plate 124 is properly retained and will also provide a facile arrangement for changing the compensating plate 124 to whatever thickness is appropriate to the thickness of the specific block "B" on which the surfaces "S" are to be formed. The disposition of the rotational axis 48 of the cradle 46 with respect to the translational direction 16, and/or the cutting member 92, can be varied to provide shapes that are not symmetrical. The angular disposition of the axis 75 of the guide member 72 can be controlled to establish the rotational range of the angular excursion that the cradle 46 undergoes during translation thereof. Thus, articles having a wide variety of shapes and sizes with variously configured contoured surfaces can be made with a single apparatus. By setting the rotational axis 48 of the cradle 46 oblique to the direction 16 the cradle 46 is translated, the overall shape of the surface "S" can be controlled to effect the desired location of the lumbar supporting region 115 and the wing portions 116 and 118.

Figure 5D:
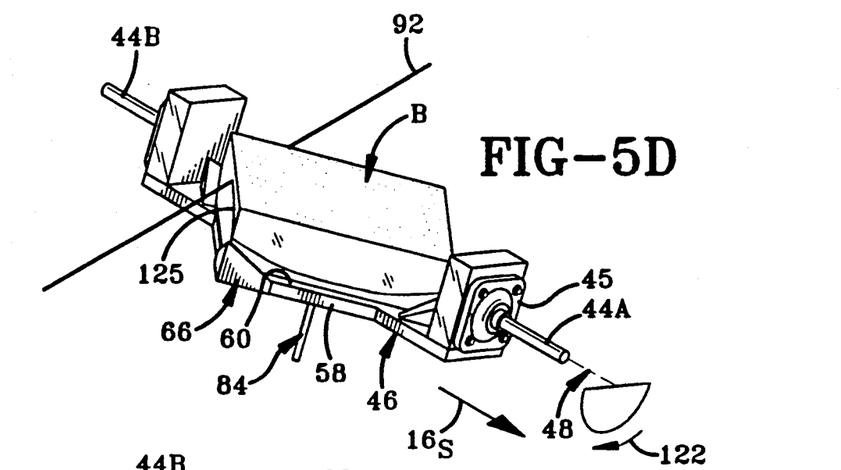
Figures 5E, 6:
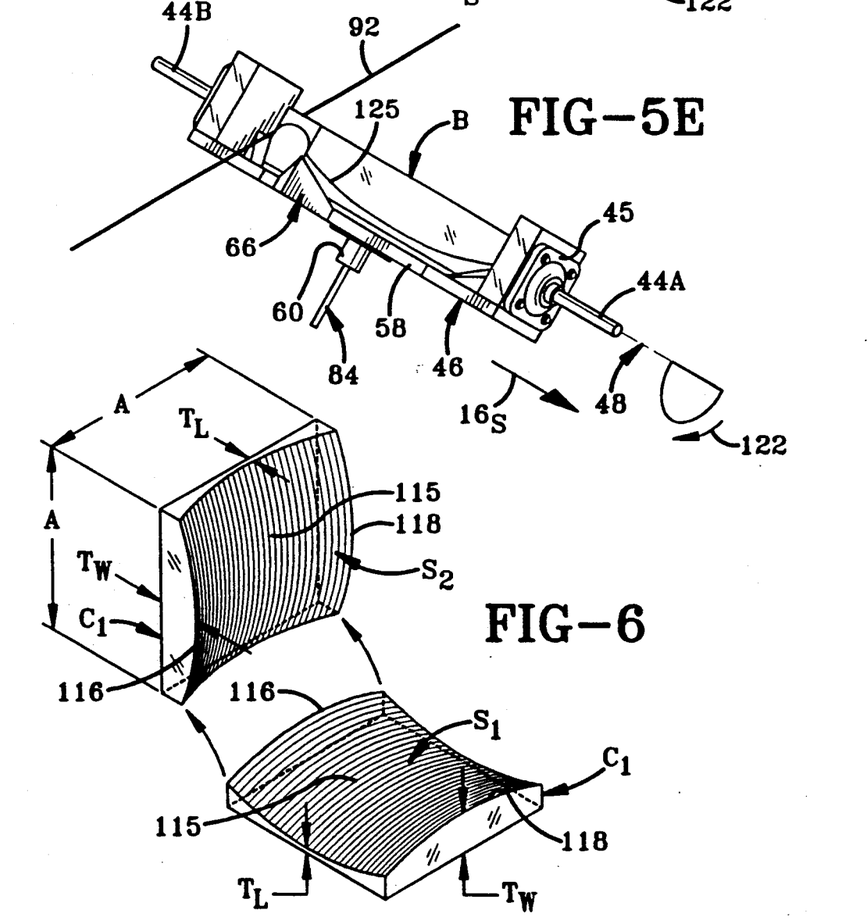
FIG. 6 is a perspective depicting a pair of cushions cut from the block, the cushions being separated in the direction of the arrows to expose the opposed parting faces which constitutes the contoured surfaces formed in mirror image by the apparatus depicted; and, FIG. 7 is an enlarged area of FIG. 3 depicting a representation of the angle $\Theta$ at one instantaneous value during its progression, and from which the trigonometric expression which defines, mathematically, the degree to which the cradle is rotated in response to the extent to which the cradle has been translated may be demonstrated.

To provide a cushion "C" having an axis of symmetry, the rotational axis 48 of the cradle 46 is parallel with the translational direction 16 along which the carriage 14 is movable. As shown in FIG. 6, the resulting cushions will each have a sagittally disposed lumbar supporting region 115 which curves convexly and laterally spaced wing portions 116 and 118 which are defined by a transversely oriented, concave curve which merges with the lumbar supporting region 115. The cushion "C" will be in the general shape of a saddle—i.e.: a hyperbolic paraboloid—with the wings 116 and 118 having the same dimensional projection relative to the center of the lumbar supporting region 115 as the ends of the lumbar supporting region 115 are recessed relative to the central portion of the lumbar supporting region 115. The projection of the wings 116 and 118 is controlled by the extremes of the angular excursion through which the cradle 46 is rotated. These angular extremes are controlled by the angular disposition of the guide member 72 axis 75 in the rotational rate selector 70 relative to the translational direction 16. If the axis 75 of the guide member 72 is disposed parallel to the direction 16 of translation, the surface will be flat. As the angle of the guide member 72 is increased, the projection of the wings and curvature of the lumbar supporting region 115 will increase.

To cut a block "B" of cellular foam material into a pair of cushions $C_1$ and $C_2$ with contoured surfaces $S_1$ and $S_2$, as seen in FIG. 6, the cradle 46 and carriage 14 are positioned at one end of the range of each of their respective movements. That is, the carriage 14 is positioned at one end of its translatory range of motion along direction 16, and the cradle 46 is positioned at one end of its rotation range of movement about axis 48. The angle at which the rotational axis 75 of the guide member 72 on the rotational rate selector 70 is oriented with respect to the translational direction 16 of the carriage 14 is established and secured, as by the locking wedge 90. The cutting member 92 is tensioned, by the application of the required weight 110, and the cutting member 92 is heated by the application of the requisite electrical power to the bus bars 94 and 96. A block "B" of cellular foam material is positioned on the compensating plate 124, or the flat supporting surface 60 presented from the pan 58 of cradle 46, as appropriate. The carriage 14 is then moved along is translational direction 16, and the cradle 46 is rotated by the interaction of the interfacing connector 84 with the slot 82 in the guide member 72 of the rotational rate selector 70. The translatory motion of the carriage 14 is depicted by the single headed arrow $16_s$ in FIG. 5A and the rotational motion is represented by arrow 122, also appearing on FIG. 5A.

As the block "B" is translated, and rotated, the cutting member 92 cuts a kerf 125 into the block "B". In FIG. 5B the block "B" has been translated, and rotated, through approximately one fourth of the translatory and rotational range. The progress can be readily observed by the extent to which the kerf 125 has extended. FIG. 5C depicts the disposition of the cradle 46 after approximately one half of the translatory and rotational movement has been completed, and FIG. 5D represents the disposition of the cradle 46 after approximately three quarters of the translatory and rotational movement has been completed. The cutting member 92 has severed the block "B" along the opposed parting faces defined by the kerf 125 which delineates the contoured surfaces $S_1$ and $S_2$ and the cushions $C_1$ and $C_2$ may be separated, as shown, in FIG. 6.

The apparatus 10 heretofore described constitutes an excellent representation of a typical mechanism which embodies the unique structure capable of forming a contoured surface according to the method of the present invention, but the concept can be broadly defined as an apparatus which rotates a cradle 46 about a rotational axis 48 in response to translation of the cradle 46 along the translational direction 16. In addition, there must be some means which effects rotation in response to translation thereof, and that interaction can be defined in the trigonometric function:

$$\tan \theta = kx \qquad (1)$$

Figure 7:
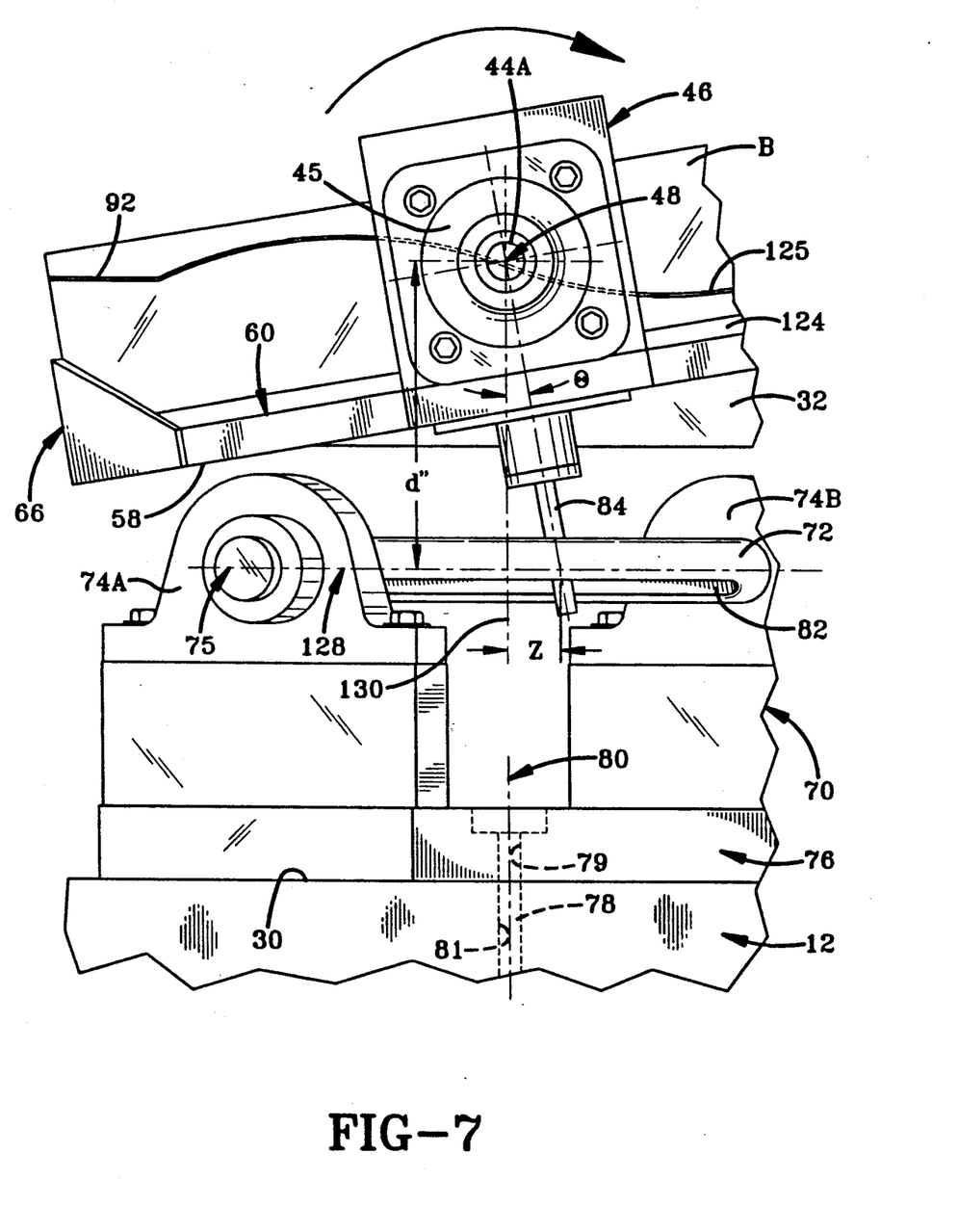

With reference to FIG. 7, the angle $\Theta$ represents the incremental angular rotation of the cradle 46 as it rotates in response to the incremental, linear displacement of the cradle 46 along the translational direction 16.

Fully to understand the foregoing mathematical relationship as it applies to the present invention one must appreciate that the term "x" represents an incremental distance along which the cradle is translated from a reference position. Moreover, the dimension "x" can be either positive or negative. The reference position is established when the apparatus 10 is initially configured to effect a desired contour. Specifically, when the cradle 46 is disposed such that the supporting surface 60 on the pan 58 is parallel to a first reference plane 128, there is no offset, and $\Theta$ is, therefore, equal to zero degrees. A set-up interface connector (not shown) may be used to determine that the reference position is properly located. The set-up interface connector may be similar to the interface connector 84 depicted in FIG. 2, except that the shaft portion is considerably longer than the shaft portion 88 of the interface connector 84. When the shaft portion of the elongated, set-up interface connector is inserted through the bore 126 in the compensating plate 124, the central aperture 68 of the pan 58, the slot 82 in the guide member 72, the bore 79 in the base support bracket 76 and the central aperture 81 in the base 12, the components are disposed such that angle $\Theta$ is equal to zero degrees.

Because the set-up interfacing connector is then concomitant with the axis 80, the axis 80 also defines the origin from which the dimensions "x" are measured parallel to the translational direction 16. In one direction the dimension "x" is deemed to be a positive dimension, and in the other direction the dimension "x" is deemed to be a negative dimension.

The identifier "d" designated in FIG. 7 identifies that dimension between the rotational axis 48 and a first reference plane 128 which is disposed not only to include the rotational axis 75 of the guide member 72, but also, as shown, to be parallel to the rotational axis 48 of the cradle 48 and include the translational direction 16. In the structural arrangement described the first reference plane 128 would, therefore, be disposed in parallel relation to the upwardly directed face 30 on the base 12. As one could experimentally verify, the numerical value of the distance "d" may be arbitrarily established, so long as it represents the distance between the rotational axis 48 and the precisely located, first reference plane 128.

One side of the angle $\Theta$ is defined by a second reference plane 130 which is not only perpendicular to the first reference plane 128 but which also includes the rotational axis 48. The second side of angle $\Theta$ is defined by the centerline of the interfacing connector 84. Any instantaneous value of $\Theta$ subtends a corresponding offset "z" which constitutes the distance from the second reference plane 130 (measured along the first reference plane 128) to the intersection, or the projected intersection, of the interfacing connector 84 with the first reference plane 128.

As such:

$$\tan \theta = \frac{z}{d} \quad (2)$$

However, inasmuch as "z" varies linearly with respect to "x", and "d" is predetermined by the basic dimensions of any apparatus embodying the concepts of the present invention, the expression z/d is equal to a constant "k" (which is determined by the angular disposition of the rotational rate selector 70 relative to the translational direction 16) multiplied by "x". Accordingly, equation "1" constitutes a trigonometric expression that is derived from, and sets forth, the mathematical relationship which controls the rotation of the cradle 46 in response to the translation thereof.

It should also be appreciated that the present invention permits one to determine the proper angular disposition of the rotational rate selector 70 to produce a hyperbolic paraboloid which presents the desired curvature for the lumbar supporting region 115 as well as the desired forward projection of the wings 116 and 118.

To determine the angular disposition of the rotational rate selector 70, and thus the selection of the appropriate locking wedge 90 which provides that angular disposition, which will be designated as $\Phi$ (FIG. 2), one need only know the desired dimensions for the cushion surfaces $S_1$ and $S_2$ and the dimension of "d" (FIG. 7) of the particular forming apparatus 10 to be used.

It is given that one wishes the surfaces $S_1$ and $S_2$ to be hyperbolic paraboloids. On that basis the only dimensions of the finished cushion to be provided are: the maximum thickness of the cushion along the wings 116 and 118—which is designated as $T_W$ in FIG. 6—and the minimal thickness of the cushion along the sagittal plane of the lumbar supporting region 115—which is designated as $T_L$ in FIG. 6. With those dimensions one can mathematically determine one half the difference between those dimensions, which shall be arbitrarily designated as "H". Hence:

$$H = \tfrac{1}{2}(T_W - T_L) \quad (3)$$

In addition, one must know one side dimension of the square cushion, which dimension will be arbitrarily designated as "A" (as is also shown in FIG. 6). With the numerical value of "H", the dimension "A" and the dimension "d"—which is identified in FIG. 7 as being the vertical dimension between the rotational axis 48 of the cradle 46 and the horizontal reference plane 128 which includes the centerline of the guide member 72—the angular disposition $\Phi$ of the rotational rate selector 70 can be determined by the following formula:

$$\Phi = \tan^{-1}\left(\frac{8Hd}{A^2}\right) \quad (4)$$

While the preferred method and apparatus for cutting the block is a heated wire as described above, other cutting methods and apparatus can be utilized. For example, a band saw or reciprocating saw can be mounted to provide the desired linear cutting edge. It is also possible to incorporate a laser beam as the cutting edge. The examples given herein are not by way of limitation as those skilled in the art will readily recognize that various cutting apparatus can be used without departing from the spirit and scope of the invention. It will also be readily appreciated, by those skilled in the art, that the cutting edge can be translated and the carriage remain stationary to enjoy the benefits of this invention. Various mechanisms for rotating the cradle or the cutting edge will occur to those skilled in the art and the exemplary embodiment described above should not be considered to limit the scope of the invention.

When the components of the forming apparatus 10 are disposed such that the rotational axis 48 of the cradle 46 and the cutting member 92 intersect not only each other but also the vertical axis 80, the contoured surfaces $S_1$ and $S_2$ will be symmetrical with respect to orthogonal axes, such as the diagonals of the cushions "C". The shape of the contoured surfaces "S" are each substantially a hyperbolic paraboloid. Each cushion "C" has a lumbar supporting region 115 and wings 116 and 118. As depicted, the supporting region 115 is centrally disposed and the wings 116 and 118 are spaced laterally outwardly of the lumbar supporting region 115. With the components disposed relative to the vertical axis 80, as described at the beginning of this paragraph, the lumbar supporting region 115 is sagittally disposed. By adjusting the angular disposition of the rotational rate selector 70, the curvature of the lumbar supporting region 115 and the projection of the wings 116 and 118 can be selectively varied. By adjusting the rotational axis 48, the position of the lumbar supporting region 115 and the wings 116 and 118 can be changed. With proper control of the axes involved, the lumbar supporting region 115 can be shifted left or right of the sagittal plane or skewed with respect thereto. Thus, very specialized cushion shapes, such as those required for rehabilitation or therapy, can be provided with the same apparatus and method that is used to manufacture the symmetrical cushions "C".

The foregoing description of the exemplary embodiment of the invention has been presented for the purposes of illustration and description. The described embodiment and the above mentioned variations are not intended to be exhaustive or to limit the invention to the precise form disclosed. Obvious modifications or variations are possible in light of the above teachings. The exemplary embodiment was chosen and described to provide a clear illustration of the principles of the invention and its practical application in order thereby to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches that a method and apparatus embodying the concepts of the present invention produces the desired contoured surfaces along the opposed parting faces of a block that has been severed by the concepts of the method and apparatus described but that the other objects of the invention can likewise be accomplished.

I claim:

1. Apparatus for forming a contoured surface on a block of material, said apparatus comprising:

a base having a longitudinal axis;

a translatable carriage movable along said longitudinal axis;

a cradle mounted on said carriage for rotation about a rotational axis extending substantially in the direction of said longitudinal axis, said cradle being adapted to support a block of material;

a cutting member, said cutting member having a cutting axis and adapted to engage the block of material upon translation of said carriage with the cutting axis disposed substantially perpendicularly with respect to the longitudinal axis;

means selectively to control rotation of said cradle in response to translation of said carriage.

2. Apparatus, as set forth in claim 1, wherein:
said means selectively to control rotation of said cradle controls both the rate and range of rotation.

3. Apparatus, as set forth in claim 1, wherein said means selectively to control rotation of said cradle in response to translation of said carriage further comprises:
a rotational rate selector carried on said base; and,
an interfacing connector operatively interacting between said cradle and said rotational rate selector.

4. Apparatus, as set forth in claim 3, wherein:
said rotational rate selector has a rotatable, slotted guide member; and,
said cradle presents an interfacing connector that is slidably interactive with said slotted guide member.

5. Apparatus, as set forth in claim 4, wherein:
said rotational rate selector is mounted on said base for selective positioning about a rate selecting axis that is oriented perpendicularly with respect to said rotational axis.

6. Apparatus, as set forth in claim 5, further comprising:
a locking means selectively to fix the position of said rotational rate selector about said rate selecting axis.

7. A method of forming a contoured surface with a compound curvature on a block comprising the steps of:
mounting the block to be contoured on a cradle having a translational direction and a rotational axis substantially parallel with the translational direction;
presenting a substantially linear cutting member substantially perpendicular to the translational direction and non-parallel with the rotational axis;
simultaneously effecting selective translation and rotation of the cradle relative to the cutting member; and,
cutting the block with the cutting member in response to the simultaneous relative translation and rotation to form a contoured surface on the block.

8. A method, as set forth in claim 7, comprising the further steps of:
interfacing the cradle with a rotational rate selector in order to control the relative rotational range in response to relative translation.

9. A method, as set forth in claim 8, comprising the further steps of:
adjusting the rotational rate selector to effect a predetermined range of rotation in response to selected translation.

10. Apparatus for forming a saddle-shaped contoured surface on a block comprising:
cradle means adapted to support the block;
said cradle means having axle stubs to define a rotational axis;
carriage means for supporting said cradle means for rotation about said rotational axis;
said carriage means being translatable along a translational direction;
linear cutting means disposed substantially perpendicular to said rotational axis;
means for providing relative linear motion between said carriage and said cutting means; and,
means for effecting rotation of said cradle relative to said cutting means in response to translation of said cradle.

11. Apparatus, as set forth in claim 10, wherein:
said cutting means includes means for maintaining the intersection of said cutting means and said rotational axis.

12. Apparatus, as set forth in claim 10, wherein said means for effecting rotation of said cradle in response to translation thereof further comprises:
a rotatable member having a slot extending therealong; and,
an interfacing member presented from said cradle for sliding engagement with said slot.

13. Apparatus, as set forth in claim 12, further comprising:
means for establishing an angular relation between said rotational member and the direction of translation.

14. Apparatus, as set forth in claim 12, further comprising:
axle support assemblies on said carriage for supporting said axle stubs on said cradle at a predetermined angle relative to the direction of translation.

15. Apparatus, as set forth in claim 12, wherein said cutting means further comprises:
electrically heatable wire means; and,
means for maintaining a substantially constant tension in said electrically heatable wire means.

16. Apparatus for forming a contoured surface on a block comprising:
cradle means having a first rotational axis;
means for supporting the block relative to said rotational axis;
a guide member rotatable about a second rotational axis;
carriage means for supporting said cradle means;
a base for supporting said carriage means;
means for moving said carriage means along a translational direction;
means for supporting said guide member on said base at a predetermined orientation with respect to said translational direction;
means for effecting rotation of said cradle through a predetermined range;
cutting means disposed in a plane substantially perpendicular to said first rotational axis.

17. Apparatus, as set forth in claim 16, wherein:
said guide member has a slot; and,
an interfacing means slidably engaging said slot.

18. Apparatus for forming a contoured surface on a block, said apparatus comprising:
cradle means to support a block of material on which the contoured surface is to be formed;
means to rotate said cradle means about a rotational axis;
means to move said cradle along a translational direction;
means to control rotation of said cradle in response to translation of said cradle according to the function tan Θ=kx, wherein Θ designates the incremental angular rotation of said cradle, "k" represents a constant and "x" is the incremental distance the cradle has been translated from a reference position; and, linear cutting means disposed parallel to said first reference plane and intersecting said rotational axis.

19. Apparatus for forming a contoured surface on a block, as set forth in claim 18, wherein:

Θ is equal to zero degrees when said cradle is disposed at a reference position which delineates "x" as being equal to zero.

20. Apparatus for forming a contoured surface on a block, said apparatus comprising:

cradle means to support a block of material on which the contoured surface is to be formed;

linear cutting means;

means to effect relative rotation between said cradle means and said linear cutting means about a rotational axis;

means to effect relative translation between said cradle and said cutting member along a translational direction;

means to control said relative rotation in response to said translation according to the function tan Θ=kx, wherein Θ designates the incremental, relative angular rotation, "k" represents a constant which is determined by the nature of the means to control said relative rotation between said cradle means and said cutting means and "x" is the incremental distance achieved by said relative translation.

21. A method for forming a contoured surface in the nature of a hyperbolic paraboloid to serve as a back cushion for humans, the cushion having a sagittally oriented lumbar supporting portion and lateral wings, the cushion being cut from a square block of material and the method comprising the following steps:

determining the side dimensions "A" of the square block of material;

selecting the desired minimal thickness "$T_L$" of the desired cushion measured along a sagittal plane of what will be the lumbar supporting portion;

selecting the desired maximum thickness "$T_W$" of the desired cushion measured at the wings;

mounting the block to be contoured on a cradle having a translational direction and a rotational axis;

presenting a substantially linear cutting member substantially perpendicular to the translational direction;

interfacing the cradle with a rotational rate selector in order to control relative rotation of the cradle in response to relative translation thereof;

disposing the centerline of the rotational rate selector at an angle Φ relative to the translational direction;

determining the distance "d" from the rotational axis of the cradle to the centerline of the rotational rate selector;

adjusting the angular disposition of the rate selector by the formula $$\Phi = \tan^{-1}\left(\frac{8Hd}{A^2}\right);$$

simultaneously effecting selective translation and rotation between the cradle and cutting member; and, cutting the block with the cutting member in response to the simultaneous relative translation and rotation to form the desired contoured surface on the block.

* * * * *